United States Patent
Meller et al.

(10) Patent No.: US 8,500,918 B1
(45) Date of Patent: Aug. 6, 2013

(54) SOLAR PANEL CLEANING SYSTEM AND METHOD

(71) Applicants: Moshe Meller, Tel Aviv (IL); Eran Meller, Tel Aviv (IL)

(72) Inventors: Moshe Meller, Tel Aviv (IL); Eran Meller, Tel Aviv (IL)

(73) Assignee: Ecoppia Scientific, Ltd., Tel Aviv (IL)

( * ) Notice: Subject to any disclaimer, the term of this patent is extended or adjusted under 35 U.S.C. 154(b) by 0 days.

(21) Appl. No.: 13/751,903

(22) Filed: Jan. 28, 2013

Related U.S. Application Data

(60) Provisional application No. 61/647,010, filed on May 15, 2012, provisional application No. 61/663,827, filed on Jun. 25, 2012, provisional application No. 61/725,280, filed on Nov. 12, 2012.

(51) Int. Cl.
*B08B 3/00* (2006.01)

(52) U.S. Cl.
USPC ........ 134/56 R; 134/57 R; 134/58 R; 134/93; 134/122 R; 15/320

(58) Field of Classification Search
None
See application file for complete search history.

(56) References Cited

U.S. PATENT DOCUMENTS

| | | |
|---|---|---|
| 8,240,320 B2 | 8/2012 | Mertins et al. |
| 8,323,421 B2 | 12/2012 | Lee |
| 2002/0066473 A1 | 6/2002 | Levy et al. |

*Primary Examiner* — Eric Golightly
(74) *Attorney, Agent, or Firm* — Holtz, Holtz, Goodman & Chick, PC

(57) ABSTRACT

System and method for cleaning a solar row of solar panels. The solar row has an upper edge elevated from ground level more than a lower edge to provide an inclination of the solar row. A cleaning assembly operates to clean a surface of the solar panels. A support frame supports the cleaning assembly and enables the cleaning assembly to move (1) upwardly and downwardly in the width direction of the solar row, and (2) in the length direction of the solar row. Operation and movement of the cleaning assembly is controlled by a control unit to cause the cleaning assembly to clean a surface of the solar panels during downward movement of the cleaning assembly. The cleaning assembly is preferably not operative during its upward vertical movement. During the downward movement, the cleaning assembly removes dirt, debris and dust from the surface of the solar panels and generates an air stream to blow off the dirt, debris, and dust.

26 Claims, 6 Drawing Sheets

SOLAR PANEL CLEANING SYSTEM AND METHOD

CROSS-REFERENCE TO RELATED APPLICATIONS

This application claims priority of U.S. provisional patent application Ser. Nos. 61/647,010 filed May 15, 2012, 61/663,827 filed Jun. 25, 2012 and 61/725,280 filed Nov. 12, 2012, all of which are incorporated by reference herein.

BACKGROUND OF THE INVENTION

The challenges of global climate change and energy security demands have made the development of renewable energy alternatives vital for the future of mankind. The use of direct sun radiation on solar panels can potentially produce more than enough energy to meet the energy needs of the entire planet. As the price of solar power decreases and that of conventional fuels rises, the solar business has entered a new era of worldwide growth.

In order to bring technologies to exploit solar energy one step closer to par with petroleum, efficiency rates of solar systems must improve.

Solar panel surfaces are typically made of high quality glass and the efficiency of the renewable energy they generate depends, among other things, on the cleanliness of the glass surfaces. Due to dust and other type of dirt and/or debris on the surfaces of the solar panels, energy losses, in some cases, can reach over forty percent (40%).

As most solar parks or other installations and concentrations of solar panels are located in desert areas where the sun's radiation is intensive and exposure to dusty conditions is high, cleaning the solar panels becomes essential.

Currently, existing cleaning processes of solar panels are costly, labor intensive and consume high volumes of water. Due to shortage of water in desert areas, solar panel cleaning using water, or wet cleaning, is a major obstacle for the solar industry.

OBJECTS AND SUMMARY OF THE INVENTION

An object of the present invention (hereinafter will be referred to as "the invention") is to provide a system and a method that will make solar panel cleaning simple, efficient, and which could be water free.

Another object of the invention is to provide a system and a method that will make the solar panel cleaning process automatic and economical.

Yet another object of the invention is to provide such a system for the cleaning process that will require minimal maintenance and supervision with low construction cost.

Still another object of the invention is to provide such a system and a method that will achieve high quality cleaning along with a high level of reliability in all weather and topographic conditions. The system and method should be adaptable to existing as well as to newly built solar parks.

According to the present invention, a solar panel cleaning system and method is provided for cleaning solar panels of a solar row. The solar row has a length and a width, and the solar row is inclined and has an upper end and a lower end in the width direction of the solar row, the upper end being elevated to a position higher than the lower end. The cleaning system comprises a cleaning apparatus that is selectively operative to clean a solar panel surface of the solar row; a support frame that supports said cleaning apparatus, said support frame being configured to selectively move said cleaning apparatus in both said width direction and said length direction over a surface of the solar row; and a controller coupled to said cleaning apparatus and to said support frame to selectively move said cleaning apparatus in said length direction of the solar row, and to selectively move said cleaning apparatus up and down in said width direction of the solar row, between said upper and lower ends, and to cause said cleaning apparatus to clean a solar panel surface of the solar row during a downward movement of said cleaning apparatus in said width direction of the solar row.

In a specific embodiment, the cleaning apparatus is caused to clean the solar surface during a downward movement of the cleaning apparatus in the width direction of the solar row.

More specifically, a control system controls operation of the cleaning assembly and movement of the cleaning assembly to effect a cleaning cycle during the downward movement of the cleaning assembly. The control system then causes movement of the cleaning assembly along the solar row, to a new position at which the control system effects a new cleaning cycle. The process continues over the length of the solar row. Thereafter, the cleaning assembly may be brought to a storage or rest position.

A combined motion along both the width and length directions of the solar row can be implemented, especially at the last stage of the downward motion of the cleaning assembly. This creates a diagonal downward path of the cleaning assembly.

BRIEF DESCRIPTION OF THE DRAWINGS

The invention, together with further objects and advantages thereof, may best be understood by reference to the following description taken in conjunction with the accompanying drawings, wherein like reference numerals identify like elements, and wherein.

DETAILED DESCRIPTION

Figure 1:
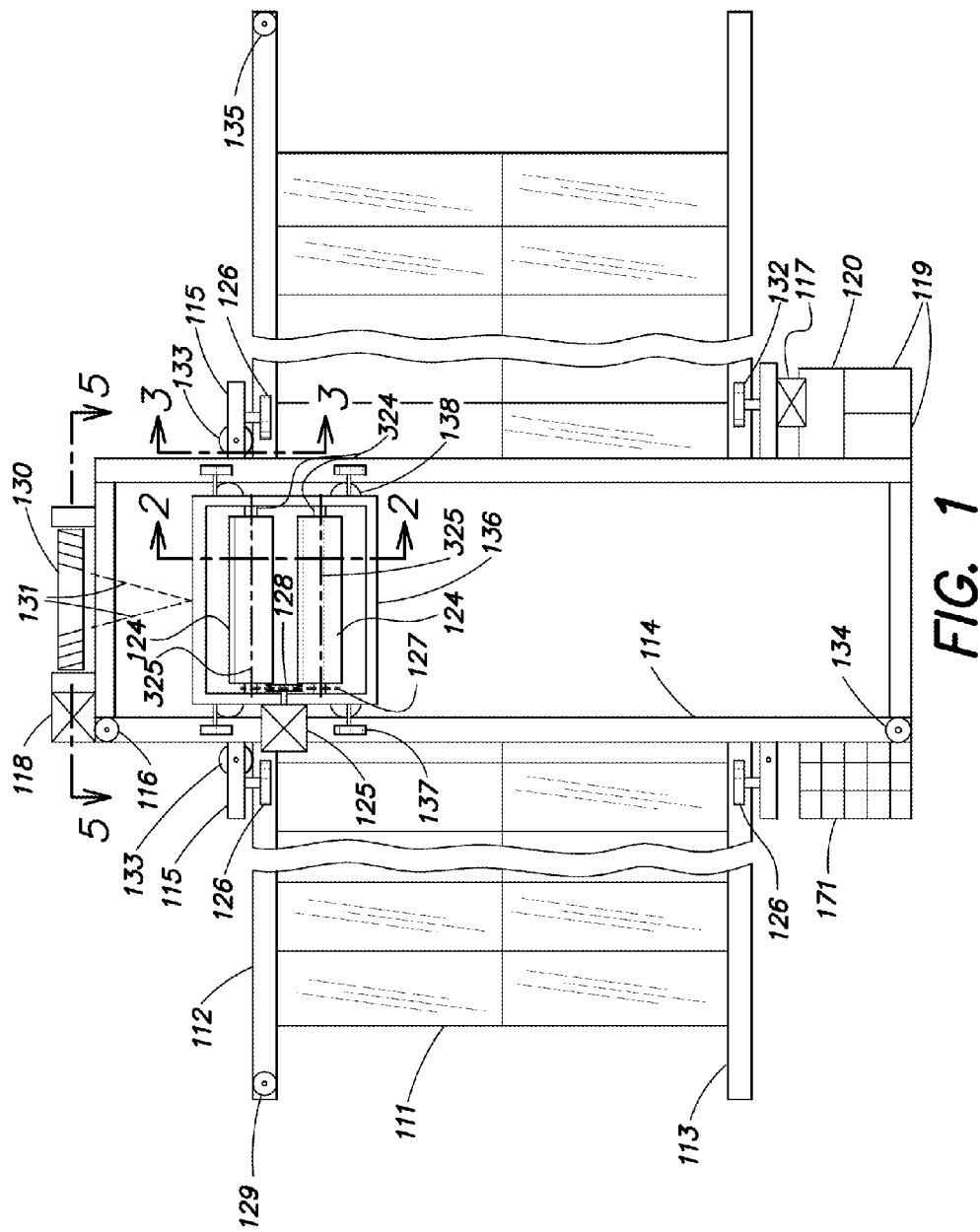
FIG. 1 is a top view of a first embodiment of a solar panel cleaning system in accordance with the invention.

Referring to the accompanying drawings wherein the same reference characters refer to the same or similar elements, FIG. 1 is a top view of an exemplifying embodiment of a solar panel cleaning system in accordance with the invention, some details of which are omitted for the sake of simplicity and clarity.

The solar panel cleaning system is shown in combination with a row of solar panel assemblies 111 (hereinafter referred to as "the solar row"). The solar row 111 comprises a plurality of solar panels of most any type and construction known to those skilled in the art. For example, a single solar panel typically would have a face area less than about one square meter. A length of the solar row 111 can vary between about a few meters to about a few kilometers. A width of the solar row 111 ranges from about one meter to about several meters.

The surface of each solar panel in the solar row 111 is preferably made of transparent material such as glass. The solar panel surface may be coated with a repellent coating that makes the cleaning process of the surface easier.

Figure 2:
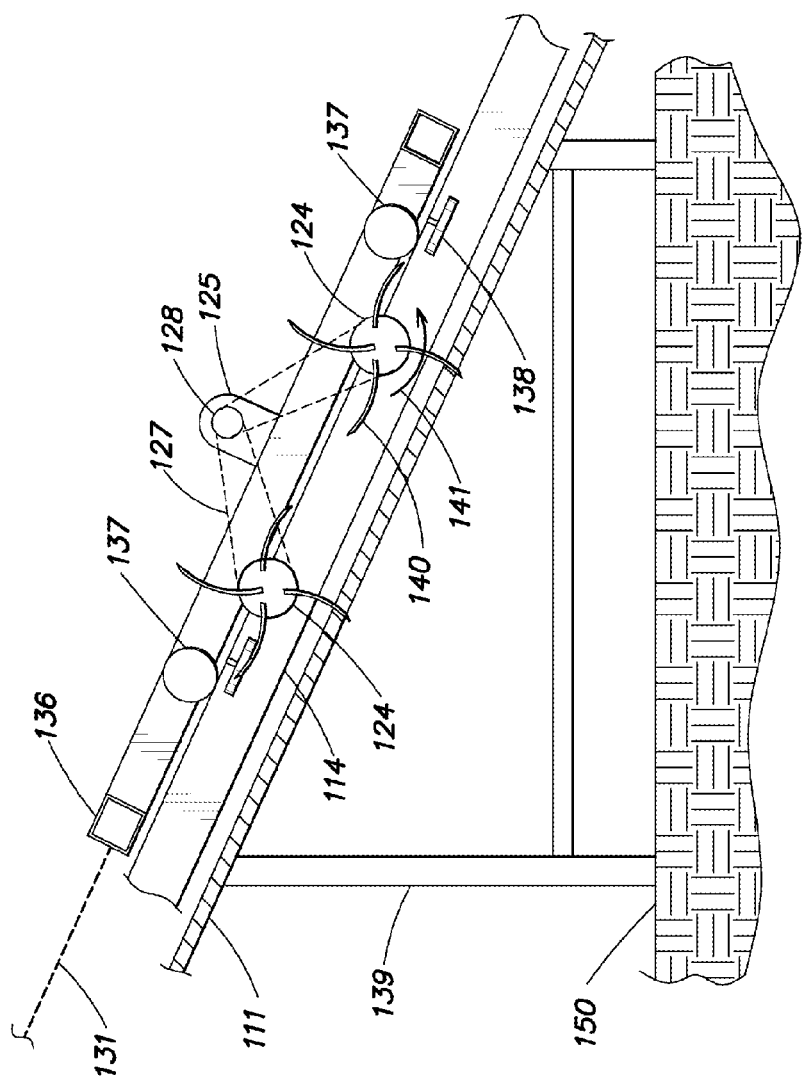
FIG. 2 is a sectional view taken along the line 2-2 in FIG. 1, showing the solar panel cleaning system in a downward motion cleaning the solar panel.

As shown in FIG. 2, the solar row 111 is constructed in an angular or inclined position toward the sun, which creates a lower edge (the rightward edge) and a higher edge (the leftward edge) of the solar row 111.

A pair of parallel rails 112, 113 are connected to the upper edge and the lower edge of the solar row 111, respectively. Rails 112 and 113 may be made from steel, fiberglass or other metallic or non-metallic materials. In some embodiments of the invention, rails 112 and 113 can be used as electricity conductors, i.e., electrical cables may be arranged in an interior of the rails 112, 113 or along an outer surface of the rails 112, 113, or the rails 112, 113 may be made of electrically conducting material and can be used as electrical conductors for the system.

The cleaning system includes a support frame that enables bi-directional movement of a cleaning assembly, described below. This bi-directional movement enables the cleaning assembly to move along the solar row in two directions— along the length of the solar row 111 (left-right in FIG. 1) and in the width direction of the solar row 111. The support frame includes a main frame 114 that is configured to be movable along the length of the solar row 111. Main frame 114 is preferably made from aluminum constructive profiles but other materials such as steel or fiberglass can be used. Supporting elements 115 are connected to the main frame 114 for support, four of which are shown in FIG. 1.

Several wheels having different functions are connected to the main frame 114, there being a total of six such wheels in the illustrated embodiment although the number, function and position of the wheels may vary. These wheels enable the main frame 114 to move along the solar row 111 in the length direction of the solar row. Of these wheels, three wheels 126 support the main frame 114 in a perpendicular direction relative to the surface of the solar panels in the solar row 111 (see FIG. 1). Two other wheels 133 support the main frame 114 in a parallel direction relative to the surface of the solar panels in the solar row 111. Instead of two wheels 133, other amounts of wheels may be used, such as four.

A drive wheel 132 is arranged in the same orientation as wheels 126, i.e., in a perpendicular direction relative to the surface of the solar panels in the solar row 111, and is driven by a drive system 117, such as a motor, in forward and reverse directions. Drive wheel 132 functions to drive the main frame 114 along the solar row in the length direction of the solar row. The motor in drive system 117 may be any type of motor or other system capable of generating a motive force, such as a DC motor. When a motor is present in drive system 117, an encoder is connected to the motor and reads the angular position of the motor. The angular position is converted by a processor into a determination of the location of the cleaning system along the solar row 111. Drive wheel 132 can drive the frame 114 along the solar row in two directions.

A movement limiting sensing device 116, e.g., a limit switch or a sensor, is located on the upper edge of the main frame 114 (see FIG. 1).

A secondary frame 136 is configured to be movable along the main frame 114. When the main frame has a longitudinal axis as shown, the secondary frame 136 may be considered to move longitudinal or in the longitudinal or length direction along the main frame 114. Secondary frame 136 is preferably made from aluminum profiles, although other materials may be used.

Secondary frame 136 supports at least one and preferably a plurality of cleaning apparatus, such as rotational cleaning units or rotational cleaning apparatus 124 (hereinafter referred to as an "RCA"). As shown in FIGS. 1 and 2, the secondary frame 136 supports two RCAs 124. Each RCA 124 is connected to the secondary frame 136 through a respective central shaft 324 and bearings (not shown) to enable the RCAs 124 to rotate on the secondary frame 136. The rotational axis of each RCA is shown in broken lines 325 in FIG. 1.

A drive system 125 is provided to drive the RCAs 124. Drive system 125 may comprise a DC motor, or another type of motor or motive power source may be used. A power transfer system is provided to convey the motive power from the drive system 125 to the RCAs 124 and convert the motive power into rotational force to rotate the RCAs 124. For example, a pulley 128 may be connected to the drive system 125 and belts 127 wound around the pulley 128 and the RCAs 124. There may be one belt 127 wound around each RCA 124 and the pulley 128. The drive system 125 causes the pulley 128 to rotate and the rotation of the pulley 128 causes the belts 127 to move, which in turn causes a shaft of each RCA 124 to rotate. The belts 127 may be made of polyurethane and be round, but other types of belt shapes, such as V belts or timing belts, and other materials may be used.

In a preferred embodiment of the invention there are two RCAs 124, but the cleaning system in accordance with the invention is equally usable with only a single RCA 124 or with three or more RCAs 124.

Figure 4:
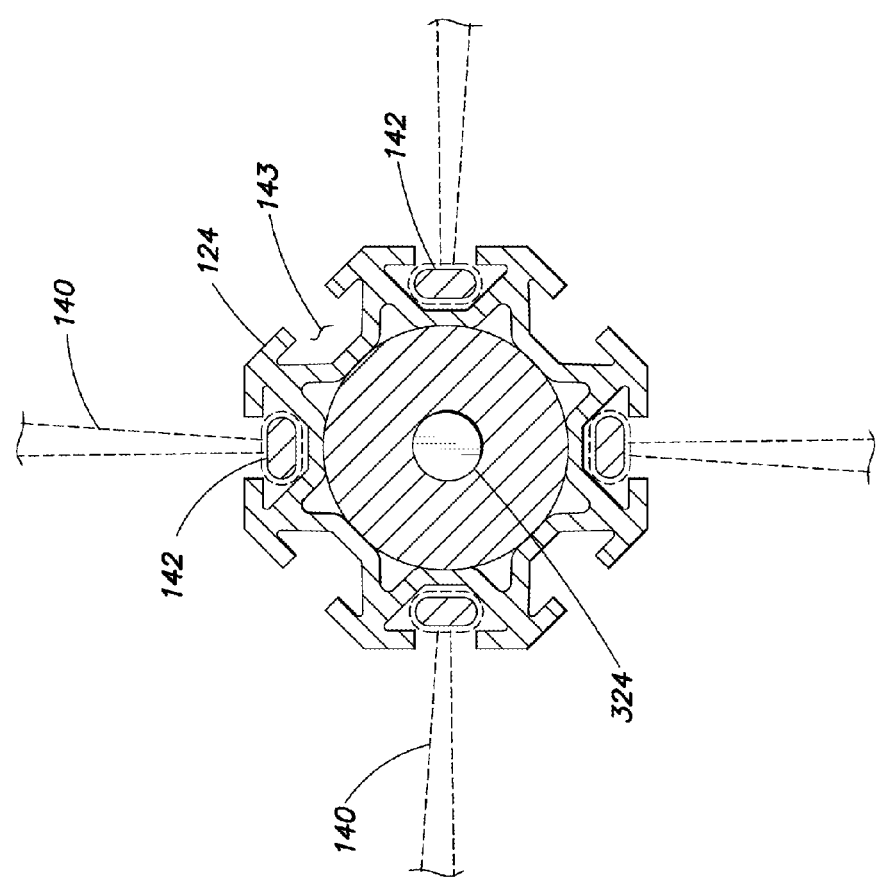
FIG. 4 is a detailed cross-sectional view of the rotating cleaning assembly.

Also, in a preferred embodiment of the invention, the RCAs 124 have roughly octagonal shapes as shown in FIG. 4, but other shapes such as cylindrical, square, hexagonal and any other flat or polygon shapes may be used without deviating from the scope and spirit of the invention.

Referring still to FIG. 4, on the outer surface of each RCA 124, one or more flexible fins 140 are connected via a connection technique to a retaining member of the RCA 124. For example, the fins 140 may be structured to provide a quick connector between the fins 140 and the recesses in the outer surface of the retaining member of the RCA 124. Using a quick connector, of which various types are known to those skilled in the art, periodic cleaning of the fins 140 can be easily implemented by removing them from engagement with the RCA 124, cleaning them and then reconnecting them with the RCA 124. Additional details about the fins 140 and their connection to the RCA 124 are set forth below.

Referring back to FIG. 1, a winch cylinder 130 has one or more cables or ropes (hereinafter referred to as cables for ease of description) 131 attached thereto and partly wound thereon. Rotation of the winch cylinder 130 controls winding or unwinding of the cables 131. This controlled winding and unwinding drives the secondary frame 136 upward along the angular slope of the main frame 114, i.e., longitudinally along the main frame 114. As illustrated, winding of the cables 131 by the winch cylinder 130 causes the upward movement of the secondary frame 136 along the solar panels in the solar row 111, while unwinding of the cables 131 by the winch cylinder 130 causes the downward movement of the secondary frame 136 along the solar panels in the solar row 111 (which is aided by gravitational pull of the secondary frame 136 downward). Winch cylinder 130 is driven by a drive system 118, which may include a DC motor.

The cables 131 are preferably made of a composite material such as KEVLAR® as an outer sleeve, and flexible isolated conductive wire as the inner core inside the sleeve. An outer diameter of each cable 131, i.e., the outer diameter of the outer sleeve, may be about 7 mm. and the diameter of the inner core may be about 4 mm. Other materials, constructions and diameters can be utilized for the cables 131. Additional details about the drive system 118 and the connection of the cables 131 are set forth below.

A power source 119 is provided to power the cleaning system, e.g., one or more batteries that may be rechargeable, replaceable, etc. For example, the power source 119 may provide power to a programmable control unit 120 that controls the operation of the cleaning system, including the operation and movement of the cleaning assembly via the various motors. The power source 119 may itself include a set of solar panels 171 attached to the main frame 114. Solar panels 171 are designed to charge any batteries of the power source 119 during daylight hours and when the solar rays are received by the solar panels 171. The power source 119 and solar panels 171 are attached to the main frame 114 to be movable therewith and thereby allow the cleaning system to operate independently without connection to any other source of electricity (other than that provided by the solar panels 171 and on-board power source 119).

Several sensing devices or sensors are provided in the cleaning system. For example, sensor 129 is positioned on the rail 112 (proximate the left edge in the construction shown in FIG. 1) to detect a maximum leftward movement of the main frame 114 on the rails 112, 113. Similarly, sensor 135 is positioned on the rail 112 (proximate the right edge in the construction shown in FIG. 1) to detect a maximum rightward movement of the main frame 114 on the rails 112, 113. Sensor 129 and/or sensor 135 may alternatively be placed on the rail 113. Sensor 116 is positioned on the main frame 114 (proximate an upper edge in the construction shown in FIG. 1) to detect a maximum upward movement of the secondary frame 136 on the main frame 114. Similarly, sensor 134 is positioned on the main frame 114 (proximate a lower edge in the construction shown in FIG. 1) to detect a maximum downward movement of the secondary frame 136 on the main frame 114.

An encoder of the motor of the drive system 117, when present, transmits limits and position signals to the programmable control unit 120, which allows an effective operation of the system. In some cases, an encoder can replace sensors 129 and 135 by feeding a position of the cleaning assembly corresponding to the positions of sensors 129 and 135. Programmable control units 120 are very well known in the industry and will not be described in detail herein.

FIG. 2 shows details of the secondary frame 136 that is movable downward and upward along the main frame 114, in the width direction of the solar row 111. To provide the solar row 111 with its angularity relative to ground level 150, an angular construction 139 supports the solar row and has a longer vertical riser construction proximate the upper edge of the solar row 111 and a shorter vertical riser construction proximate the lower edge of the solar row 111.

The secondary frame 136 has mounted thereon a plurality of wheels 137, e.g., four wheels, that rotate perpendicularly to the solar panel surface, i.e., their axis of rotation is perpendicular to the normal of the surface of the solar panels in the solar row 111. One or more additional wheels 138, e.g., four wheels, are mounted on the secondary frame 136 to rotate parallel to the solar panel surface, i.e., their axis of rotation is parallel to the normal of the surface of the solar panels in the solar row 111.

Wheels 137, 138 are connected through bearings (not shown) to the secondary frame 136 and roll against the surface of the profiles that make up the main frame 114. Wheels 137 and 138 therefore enable the secondary frame 136 to move upward and downward along the main frame 114. This movement of the secondary frame 136 relative to the main frame 114 and solar row 111 is independent of the movement of the mainframe 114 along the length of the solar row 111.

In the situation shown in FIG. 2, the RCAs 124 rotate in the same direction, counterclockwise as indicated by arrow 141. This direction of rotation preferably occurs as the secondary frame 136 moves downward along the main frame 114. The RCAs 124 are driven by the drive system 125 through the pulley 128 and the belts 127. The belts 127 drive the two RCAs 124 through two additional pulleys (not shown) that are attached to each RCA 124.

Each RCA 124 in FIG. 2 includes four fins 140 that, through a control scheme originated at the drive system 125, rotate at approximately 170 rpm, although other rotational speed are feasible. While the fins 140 rotate and the secondary frame 136 moves downward, an outer part of the fins 140 touch, sweep and wipe the surface of the solar panels in the solar row 111. Rotation of the fins 140 creates an air blowing effect which helps to push the dirt, debris and the dust on the surface of the solar panels downward as a result of the slope of the solar row 111.

FIG. 2 also shows a connection between the cable 131 that winds and unwinds about the shaft coupled to the winch 130 (see FIG. 1), and an upper edge of the secondary frame 136, close to a center region of an upper profile that is part of the secondary frame 136. Each cable 131 may be similarly connected to the shaft and secondary frame 136. When the winch cylinder 130 rotates in one direction, the length of the cables 131 between the shaft of the winch cylinder 130 and the secondary frame 136 becomes shorter, and the secondary frame 136 is moved upward. When the winch cylinder 130 rotates in the opposite direction, the length of the cables 131 between the shaft of the winch cylinder 130 and the secondary frame 136 becomes longer and the frame 136 moves downward. An angular condition should be set between a long axis of the winch cylinder 130 and the cables 131, which angle will ensure an orderly winding arrangement of the cables 131 on the winch cylinder 130.

As an alternative, the cables 131 may be connected to the center of the winch cylinder 130 and to two opposite sides of the upper profile of the secondary frame. Preferably, the cables 131 in this configuration would also create an angle between them that allows orderly rolling of the cables 131 on and off the winch cylinder 130.

Instead of the foregoing structure that imparts movement to the secondary frame 136 relative to the main frame 114, other movement systems that enable the secondary frame 136 to move along the main frame 114 are contemplated to be within the scope of the invention. For example, one such alternative includes a system with a timing belt path and a timing pulley that is driven by a gear motor.

Figure 3:
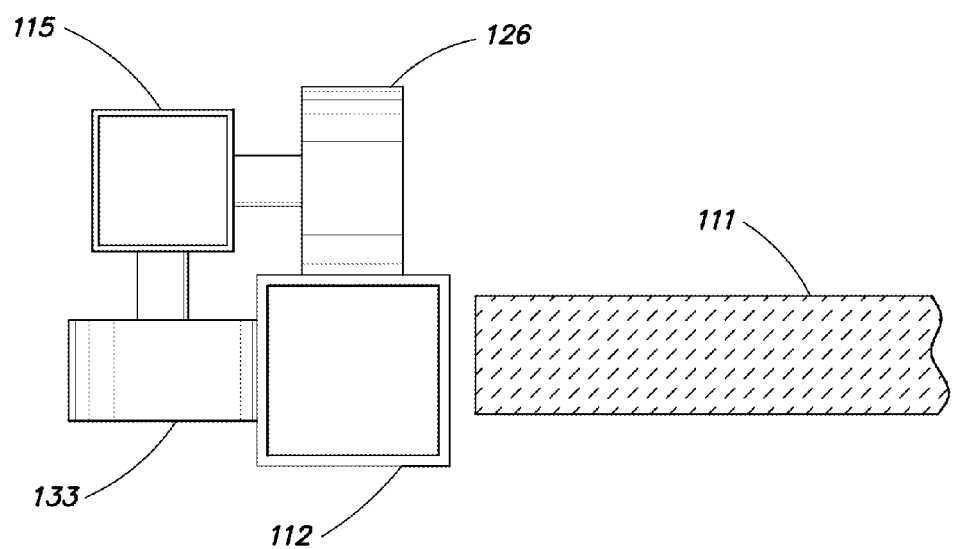
FIG. 3 is a sectional view taken along the line 3-3 in FIG. 1.

FIG. 3 shows the upper rail 112 and supporting element 115 each having a substantially square cross-section, although other shapes are possible. Wheel 126 is mounted on the supporting element 115 to rotate against an upper surface of the rail 112. The axis of rotation of wheel 126 is perpendicular to the normal to the surface of the solar panels in the solar row 111. Wheel 133 is also mounted on the supporting element 115 to rotate against a side surface of the rail 112. The axis of rotation of wheel 126 is parallel to the normal to the surface of the solar panels in the solar row 111. An assembly is formed by the supporting element 115, wheels 126 mounted thereto and wheel 133 mounted thereto. There are three such assemblies, as shown in FIG. 1. Another assembly includes one of the supporting elements 115, one of the wheels 132 and the drive system 117. These four assemblies enable mobility of the cleaning assembly along the solar row 111 in two directions.

FIG. 4 shows the RCA 124 and the fins 140 connected thereto. As shown in FIG. 4, the RCA 124 preferably has an octagonal shape with eight cavities 143, although, as mentioned before, other polygonal shapes, flat and cylindrical shapes can be provided for the RCA 124.

In a preferred embodiment of the invention, the fins 140 fold around solid center elements 142. The center elements 142 can either be connected to the fins 140 or stand as separate elements. Each fin 140, after being folded around a respective one of the center elements 142, slides into a respective cavity 143 in the RCA 124 and are locked in the cavities 143 by an appropriate locking mechanism. For example, the locking mechanism may comprise at least one flexible side O-ring (not shown).

When the RCA 124 rotates, the fins 140 with their locking elements 142 are pushed toward projections of the cavities 143 by centrifugal force and are locked and rotate along with the RCA 124. Although FIG. 4 shows four fins for the RCA 124, any other number of fins can be used, from one to eight when the octagonal shaped RCA 124 has eight cavities 143.

In a preferred dry cleaning system and method, the fins 140 may be made of fabric. A preferred fabric is microfiber fabrics which are known by professionals for their cleaning and durability qualities. Microfiber fabrics are also very soft and they will not harm the surface of the solar panels. Other fabrics and/or materials are also viable. For a wet cleaning system and method, the fins 140 should be made from different materials and/or fabrics.

Regardless of the type of cleaning system, the fabrics may be coated with silicon, neoprene or other rubber-like materials. In some conditions, combinations of different types of fins can be used. The quick connection capability between the fins 140 and RCA 124, described above, facilitates easy and quick replacement of the fins 140 to enable them to be washed periodically. The preferred quick connection described above is only one manner for connecting the fins 140 to the RCA 124 and additional types of quick connection between the fins 140 and the RCA 124 are also considered part of the invention, such as Velcro strips, zippers and the like.

A length of the RCA 124 and the length of the fins 140 can vary. Preferred sizes of the fins 140 are between about 400 mm, and a preferred length of the RCA 124 is about 1400 mm.

Figure 5:
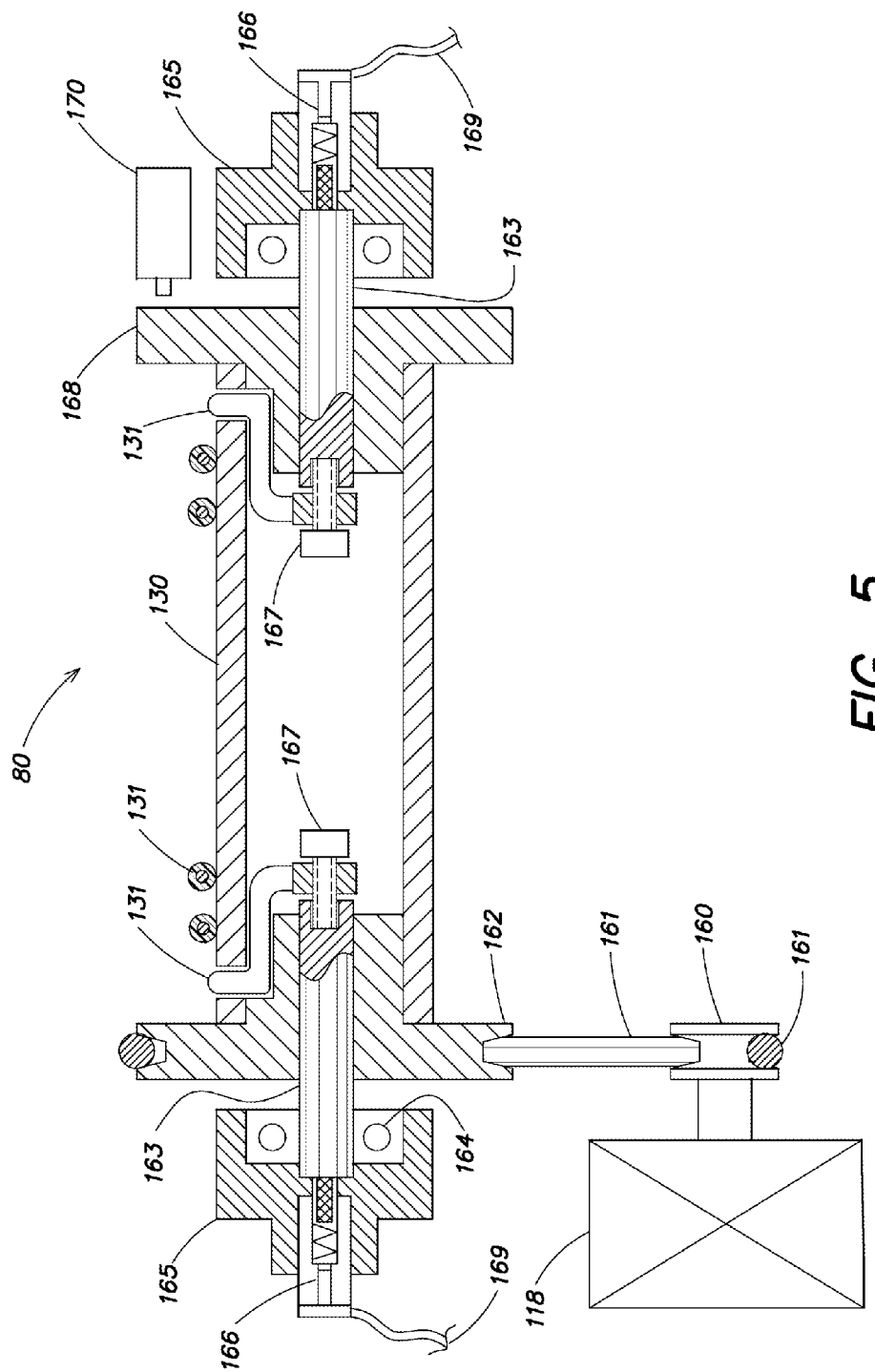
FIG. 5 is a sectional view taken along the line 5-5 in FIG. 1.

FIG. 5 shows an assembly 80 of the winch that includes the winch cylinder 130, and the ropes or cables 131 that wind about the winch cylinder 130 and connect the winch cylinder 130 to the secondary frame 136. As explained above, each cable 131 has conductive inner core and KEVLAR® as an outer sleeve, with other constructions and materials for cables 131 being contemplated by the inventors.

Drive system 118 drives and rotate the winch cylinder 130 through a pulley 160 that receives the motive output of the drive system 118, a belt 161 that passes around the pulley 160 and another pulley 162 that is connected to the winch cylinder 130. Drive system 118 may include a DC motor that can rotate in two directions, i.e., cause clockwise and counterclockwise rotation of the pulley 160. Rotational force can thus be transferred from the drive system 118 to the winch cylinder 130 through a belt or gear reduction. The rotational speed of the winch assembly 80 can be around 100 rpm, although other rotational speeds can be used.

The winch assembly 80 also includes two conductive shafts 163 mounted on respective bearings 164, which in turn are housed partly in and supported by respective two bearing housings 165. Bearing housings 165 are connected to the main frame 114, and more specifically to an upper profile from which the main frame 114 is formed (see FIG. 1). One conductive shaft 163 at one end of the winch cylinder 130 passes through the pulley 162 and the other conductive shaft at the opposite end of the winch cylinder 130 passes through an end disc 168.

Electrically conductive brushes 166 are situated in each of the bearing housings 165 and transmits electricity to the two cables 131 through connectors 167 while the winch cylinder 130 is rotating. Two electrical wires 169 connect the electrically conductive brushes 166 to an electrical power supply through the control unit 120 (see FIG. 1).

In one embodiment, two drive systems 118 are provided. In this case, the end disc 168 is replaced by another pulley, like pulley 162.

A locking mechanism 170 is optionally provided to lock the secondary frame in position. Locking mechanism 170 utilizes a solenoid which when energized, locks the secondary frame 136 in, for example, the upper position while the cleaning system is in a rest mode.

When the control unit 120 gives a command that connects the drive system 118 of the winch assembly 80 to the electricity power supply at a certain polarity, the winch cylinder 130 rotates in a predetermined direction, the cables 131 become shorter and the secondary frame 136 moves upward in the width direction of the solar row. Once the secondary frame 136 reaches the upper end of the main frame 114, the sensor 116 provides a signal to the control unit 120. At this stage, control unit 120 provides the drive system 118 with signals or electrical conditions that causes the secondary frame 136 to move downward, preferably at a predetermined speed, in the width direction of the solar row. These electrical conditions depend on, for example, one or more of the following: an angular position of the solar panel row 111, weight of the secondary frame 136 and the specifications of the RCA 124. The electrical conditions can be one or more of the following: the voltage and the polarity supply to the drive system 118, the operation of a motor of the drive system 118 as a braking generator under short circuit condition, and the operation of the motor of the drive system 118 as a braking generator on specific loads such as power resistor or diodes in any possible configuration. While other arrangements are feasible, two possible configurations include Zener-type diodes or diodes in serial connection.

Another important load arrangement that can control the downward speed of the secondary frame 136 is the connection of the drive system 118, while it operates as a generator, to a special electronic circuit that converts the generating power of the drive system 118 into a sufficiently high voltage that can charge the batteries in the power source 119, to which it is connected in an electrical circuit. This arrangement can reduce the required energy to operate the cleaning system. All of these electrical conditions are designed to control the downward speed of the secondary frame 136 and they are part of the present invention.

When the secondary frame 136 starts its downward motion, the control unit 120 connects the cables 131 to the power supply in a certain polarity that causes the RCAs 124 to rotate at a pre-determined speed and in a desired direction, and thereby clean the surface of the solar panels of the solar row 111.

With respect to more particular details about an exemplifying operation and control of the cleaning system, in any of the embodiments described above, during the vast majority of the time, the system remains in its stationary position with power source 119 connected to and charged by the solar panels 171 (hereinafter this position is referred to as "the home station"). The control unit 120 can trigger a command that will start the system's cleaning process. This command can come from either a preprogrammed schedule or from a command initiated by a control center of the solar panel installation. The solar panel installation may include several solar rows and thus, one cleaning system for each solar row. The solar installation will therefore have several cleaning systems. Optionally, each cleaning system has its own address and location code.

The triggering command is system independent and each system can be autonomous. The control center of the solar panel installation can optionally continuously monitor the output power of the solar row(s) 111 in the installation, the location of each cleaning system and can optionally detect technical problems of any system.

Optionally, the cleaning process can be controlled by a control unit that receives and factors in dynamic information, such as local weather conditions (present and forecast), sand storms and other factors that negatively impact the output power of the solar panels in the solar row 111. These factors can be taken into account in order to trigger the cleaning process, or a schedule for cleaning the solar panels. Such information is typically provided by suitable feeds from various servers connected to the control unit, which are omitted from the description for the sake of simplicity. One skilled in the art would readily understand from the disclosure herein how the control unit would receive and process information of value in determining a cleaning regime for the solar panels in the solar installation and how to implement this regime using the cleaning system described herein, Since the monitoring process can calculate the power output for any given solar row 111, the control unit can be configured by appropriate analysis techniques to detect any broken or stolen solar panel.

When the cleaning system is in its home station, the secondary frame 136 is preferably at the uppermost end of the main frame 114, the main frame 114 at the rightmost position relative to the solar row 111, and the locking mechanism 170 is in a lock position which requires no power. None of the drive systems 117, 118, 125, or motors operate.

Once the cleaning system receives an initiation or start command, the drive system 118 activates the winch cylinder 130, the locking mechanism 170 releases the drive system 118 and the secondary frame 136 starts to move downward. The downward speed of the secondary frame 136 is controlled as explained above. The drive system 125 also starts to rotate and causes rotation of any RCAs 124 coupled thereto, e.g., two in the illustrated embodiment. Rotation of the RCAs 124 causes the fins 140 to rotate to clean the surface of the solar panels in the solar row 111 by pushing the dust, debris and dirt downward. Rotation of the fins 140 also creates an air blowing effect which helps to push and clean the dust, debris and dirt downward along the slope of the solar panels.

Figure 6:
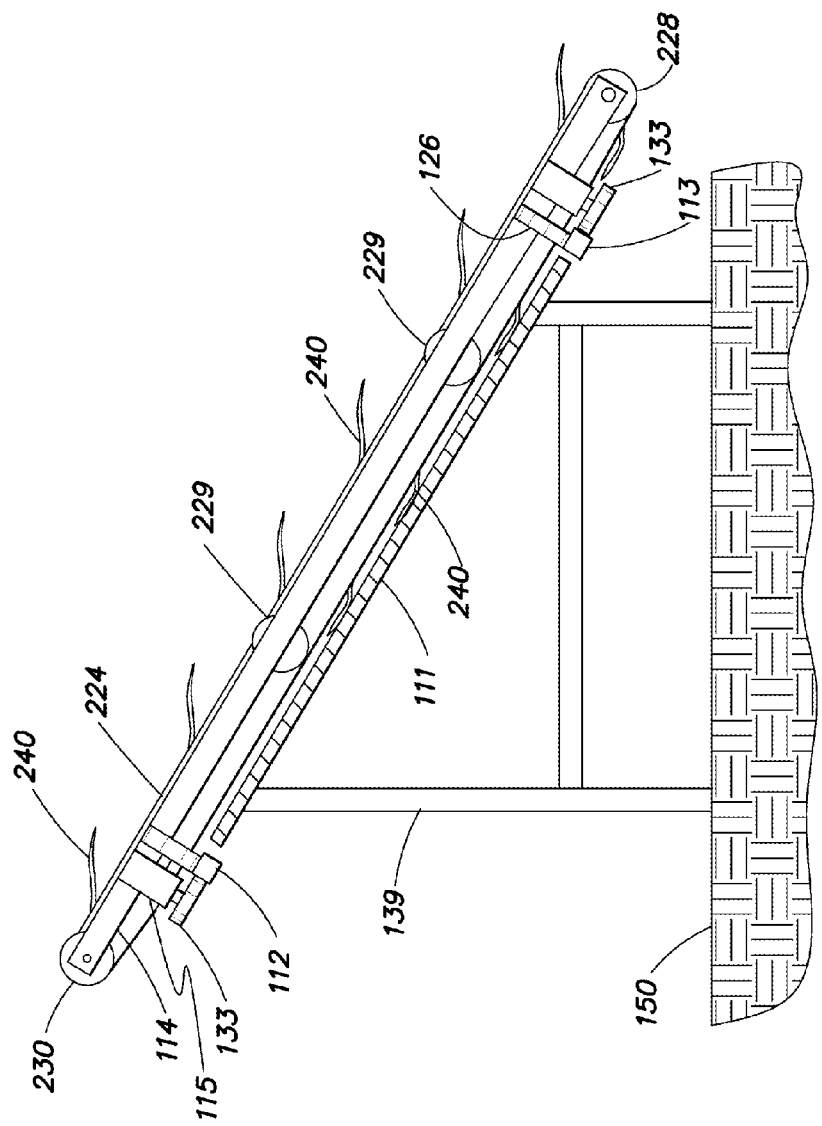
FIG. 6 is a cross-sectional view of a second embodiment of a solar panel cleaning system in accordance with the invention.

When the secondary frame 136 reaches the lower edge of main frame 114, the sensor 134 transmits a signal to the control unit 120 which is configured to direct, in response to the signal from sensor 134, the drive system 117 starts to rotate initiating motion of the main frame 114 along the length of the solar row in a leftward direction (in the embodiment of FIG. 6). The encoder of a motor in drive system 117 generates pulses during the operation of the motor. After a preset number of pulses, the motor stops by command from the control unit 120. The number of encoder pulses can be correlated to a preset distance along the length of the solar row 111. This preset distance may be equal to the width of the RCAs 124 less a few centimeters to ensure minimal overlap between the cleaning cycles.

During the operation of the drive system 117 and the movement of the main frame 114 along the solar row 111, the drive system preferably continues its operation and RCAs 124 with the fins 140 rotate and perform self-cleaning. When the main frame 114 reaches the preset travel distance, drive systems 117 and 125 stop, and drive system 118 starts rotating the winch cylinder 130 in an upward motion mode and the system starts a new cleaning cycle.

Once the system reaches the end of the length of the solar row, sensor 129 provides a signal and drive systems 117 and 125 stop and the last cycle in this direction starts. Once the last cycle is complete, the system optionally starts a repeating cleaning process in the opposite direction until the system reaches its home station. This repeating cleaning process is optional.

Control unit 120 may be configured to provide any number of different cleaning cycles, with different directions of movement of the secondary frame 136 and main frame 114. It is even possible to implement a control scheme at the control unit 120 wherein there is only a unidirectional cleaning process such that at the end of this process, the system will travel continuously to the home station. Another control scheme is that the cleaning cycle will repeat more than one time.

In some cases, the control unit 120 can cause downward movement of the secondary frame 136 during movement of the main frame 114 along the length direction of the solar row, thereby creating a diagonal cleaning path for the RCAs 124 which are mounted on the secondary frame 136. This diagonal movement is especially advantageous at the last stage of the downward movement of the secondary frame 136 during a cleaning process.

There are also cleaning operations where the end of the cleaning process is initiated by the accumulated distances from the home station and not by the sensor 129. Another possible cleaning operation is to have two cleaning systems at each end of the solar row 111 and a sensor in a middle region of the solar row 111. Each cleaning system can clean part of the solar row 111 and therefore reduce the cleaning duration of a solar row 111 (in half).

Control of the system by the control unit 120, the sensors and the encoder are very well known by professionals in the electronic industry and therefore their description is omitted for the sake of simplicity.

FIG. 6 is a partial cross-sectional, side view of another embodiment of a cleaning system in accordance with the invention. In this embodiment, the secondary frame 136 described above is not present and instead, the cleaning system includes a conveyor belt 224 that has a plurality of fins 240 on its outer surface. The conveyor belt 224 is installed along the main frame 114 and driven by a motorized driving cylinder 228 arranged in a loop of the conveyor belt 224 and at a lower section of the main frame 114.

A tension cylinder 230 is also arranged in the loop of the conveyor belt 224 and at an upper section of the main frame 114. Tension cylinder 230 provides necessary tension to the conveyor belt 224 to enable its movement. Conveyor belt 224 is driven so that its upper section moves upward over the solar panel row 111 in the width direction of the solar row without touching the surface of the solar panels in the solar row 111, while the lower section of the conveyor belt 224 moves downward over the solar panel row 111 and the fins 240 along this lower section touch, sweep, wipe and clean the surface of the solar panel in the solar row 111.

Supporting cylinders 229 are arranged in the loop of the conveyor belt 224 to support the movement of the conveyor belt 224 and the upper section of the conveyor belt 22, i.e., prevent the upper section from coming into contact with the lower section and adversely affecting the operation of the fins 240 along the lower section.

The width of the conveyor belt 224 and the length of its fins 240 can vary. A preferred length of each fin 240 is about 400 mm. A preferred width of the conveyor belt is about 1,200 mm. The fabric and/or the material of the fins 240 is/are identical to those of the fins 140 described above. The fins 240 are connected preferably to the conveyor belt 224 in a quick release connection, similar to that used above to connect fins 140 to the RCAs 124.

Operation of the cleaning system in accordance with this embodiment is similar to that described with reference to the embodiment shown in FIGS. 1-5. Thus, for the vast majority of the time, the cleaning system is in its home station. When a start command is triggered, the driving cylinder 228 is rotated and in turn starts causing the conveyor belt 224 to move. The fins 240 on the lower section of the conveyor belt 224 touch, sweep, wipe and clean the surface of the solar panels in the solar row 111. After a preset travel distance of the conveyor belt 224, which preset travel distance 224 can be determined by data from an encoder attached to the driving cylinder 228, the driving cylinder 228 stops rotating and the main frame 114 travels along the length of the solar row for a preset distance. Then, a new cleaning cycle begins. In all other aspects, the operation and the control of this embodiment of the system are substantially identical to the description provided above with respect to the embodiment illustrated in FIGS. 1-5.

With respect to the power supply for any of the embodiments of the cleaning system described above, the system includes at least one rechargeable battery, preferably a lead, sealed-type battery, although other types of batteries may be used. Regardless of which battery is used, the battery provides the required power supply to the system's drive systems 117, 118, 125, motors thereof and control unit 120 and electronic element.

During daylight while the system is at stationary position, the battery can be recharged by the solar panels 171. These panels 171 can be located in various locations along the system and can be cleaned either by the cleaning system itself, i.e., RCAs 124 or manually. It is essential to emphasize that there are other ways to provide the cleaning system with the necessary power supply. For example, the battery can be charged from an external source such as an existing power grid or the output of the solar farm or solar installation at which the cleaning system is used.

Electricity can also be supplied without the battery. In one such embodiment, electricity can be transferred to the cleaning system through conductive rails and movable connectors similar to the ones used in the train (railroad) industry. All such power supply arrangements are part of the invention.

The embodiments of the invention described above provide several advantages. Among others, one or more of the embodiments provide a system and a method that will make solar panel cleaning simple, efficient, and which could optionally not use water. Also, a system and method are disclosed that will make the solar panel cleaning process automatic and economical. Even further, a system for cleaning solar panels is provided that requires minimal maintenance and supervision with low construction cost. The invention also provides a solar panel cleaning system and method that could achieve high quality cleaning along with a high level of reliability in all weather and topographic conditions. The system is even adaptable to existing as well as newly built solar parks and solar installations.

It is to be understood that the present invention is not limited to the embodiments described above, but includes any and all embodiments within the scope of the following claims. While the invention has been described above with respect to specific apparatus and specific implementations, it should be clear that various modifications and alterations can be made, and various features of one embodiment can be included in other embodiments, within the scope of the present invention. It is to be understood that the present invention is not limited to the embodiments illustrated and described herein.

We claim:

1. A solar panel cleaning system for cleaning solar panels of a solar row, the solar row having a length and a width, and the solar row being inclined and having an upper end and a lower end in the width direction of the solar row, the upper end being elevated to a position higher than the lower end, the cleaning system comprising:

at least one cleaning apparatus that is selectively operable to clean a solar panel surface of the solar row;

a support frame that supports said at least one cleaning apparatus, said support frame being configured to selectively move said at least one cleaning apparatus in both said width direction and said length direction over a surface of the solar row, a controller coupled to said at least one cleaning apparatus and to said support frame to selectively move said at least one cleaning apparatus in said length direction of the solar row, and to selectively move said at least one cleaning apparatus up and down in said width direction of the solar row, between said upper and lower ends, and to cause said at least one cleaning apparatus to clean a solar panel surface of the solar row during a downward movement of said at least one cleaning apparatus in said width direction of the solar row.

2. The system of claim 1, wherein said controller causes said at least one cleaning apparatus to move along the solar row length direction to a new position to initiate a new cleaning cycle.

3. The system of claim 2, wherein said at least one cleaning apparatus comprises at least one rotatable cleaning apparatus.

4. The system of claim 3, wherein said at least one rotatable cleaning apparatus has cleaning fins.

5. The cleaning system of claim 3, wherein the rotation of said at least one rotatable cleaning apparatus creates an air blowing effect to blow air downward and parallel to the surface of the inclined solar panel during operation thereof.

6. The system of claim 4, wherein said cleaning fins are made from microfiber fabric.

7. The system of claim 4, wherein said cleaning fins comprise a quick connect mechanism to quickly connect said cleaning fins to said at least one rotatable apparatus.

8. The system of claim 1, wherein said at least one cleaning apparatus comprises a waterless dry cleaning process.

9. The system of claim 1, wherein said at least one cleaning apparatus comprises a wet cleaning process.

10. The system of claim 1, wherein said support frame comprises:

a main frame that is movable along the length direction of the solar row; and a secondary frame that is movable along the main frame in the width direction of the solar row;

the secondary frame including said at least one cleaning apparatus, said at least one cleaning apparatus being operable to clean the surface of the solar panel row while the secondary frame moves on the main frame in said width direction of the solar panel row from the higher end of the solar panel row toward the lower end of the solar panel row.

11. The system of claim 10, wherein said at least one cleaning apparatus comprises at least one rotatable cleaning apparatus.

12. The system of claim 10, comprising a winch with at least one cable, and wherein the winch connects the main frame and the secondary frame, such that rolling on and releasing of a winch cable causes an upward and downward motion of the secondary frame, respectively, relative to the main frame.

13. The system of claim 12, wherein the winch comprises two cables and each of said cables has a conductive section, and said two cables move said secondary frame upward and downward while electricity is transferred through the conductive sections of said cables to cause said at least one cleaning apparatus to rotate and to clean the surface of the solar panel row during downward movement of said at least one cleaning apparatus.

14. The system of claim 13, wherein said two cables are connected to two opposite sides of a winch cylinder and to a center of an upper section of the secondary frame to create an angle between said two cables that allows orderly rolling of said two cables on and off said winch cylinder.

15. The system of claim 13, wherein said two cables are connected to a center of the winch and to two opposite sides of an upper section of the secondary frame, to create an angle between said two cables that allows orderly rolling of said two cables on and off said winch cylinder.

16. The system of claim 12, comprising an electrical motor that drives the winch while said secondary frame moves upward and the same motor operates as a braking generator that controls a speed of the secondary frame when it moves downward.

17. The system of claim 16, wherein energy generated by said motor while operating as a braking generator is coupled to charge at least one battery of the system.

18. The system of claim 10, comprising a locking mechanism that locks the said secondary frame in an upper side position when the system is in a rest mode.

19. The system of claim 1, comprising a power supply including at least one battery and a set of solar panels that are connected to charge the at least one battery.

20. The system of claim 1, wherein said at least one cleaning apparatus comprises a conveyor belt.

21. The system of claim 20, comprising cleaning fins attached to said conveyor belt.

22. The system of claim 21, wherein said cleaning fins attached to said conveyor belt are arranged to touch and clean the solar panel surface while moving downward along the solar panel slope.

23. The system of claim 20, wherein said conveyor belt is operable in sequence and does not operate while the at least one cleaning apparatus moves along the length direction of the solar row.

24. The system of claim 20, wherein said conveyor belt operates continuously.

25. The system of claim 1, wherein said at least one cleaning apparatus is stationary and cleans the solar panel surface only when moving downward in the width direction of the solar panel.

26. The system of claim 1, wherein said at least one cleaning apparatus cleans the solar panel surface only when moving downward in the width direction of the solar panel.

* * * * *